US009068476B2

(12) United States Patent
Caulfeild et al.

(10) Patent No.: US 9,068,476 B2
(45) Date of Patent: Jun. 30, 2015

(54) HYBRID METAL/COMPOSITE LINK ROD FOR TURBOFAN GAS TURBINE ENGINE

(75) Inventors: Stephen Caulfeild, Rockwood (CA); Bryan Olver, Nobleton (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 840 days.

(21) Appl. No.: 13/334,517

(22) Filed: Dec. 22, 2011

(65) Prior Publication Data

US 2013/0164126 A1 Jun. 27, 2013

(51) Int. Cl.
*F01D 25/26* (2006.01)
*F01D 25/28* (2006.01)

(52) U.S. Cl.
CPC ............ *F01D 25/28* (2013.01); *F01D 25/26* (2013.01); *F05D 2300/603* (2013.01); *Y02T 50/672* (2013.01)

(58) Field of Classification Search
CPC ... F01D 25/26; F01D 25/28; F05D 2300/603; Y02T 50/672
USPC .............. 415/136–138, 142, 144–145, 213.1, 415/214.1; 248/554–557; 60/226.1–226.3, 60/262, 796, 797, 799; 244/53 R, 54, 57; 403/579 R, 593, 594
See application file for complete search history.

(56) References Cited

U.S. PATENT DOCUMENTS

| 617,484 | A | * | 1/1899 | Haskell ...................... 74/579 R |
| 2,936,978 | A | * | 5/1960 | Lauck .......................... 248/555 |
| 3,568,723 | A | | 3/1971 | Sowards |
| 3,633,951 | A | * | 1/1972 | Hinkle et al. .................. 403/83 |
| 4,247,255 | A | | 1/1981 | De Rosa |
| 4,247,259 | A | | 1/1981 | Saboe et al. |
| 4,378,961 | A | * | 4/1983 | Trousdell ..................... 415/137 |
| 4,424,003 | A | | 1/1984 | Brobeck |
| 4,458,866 | A | | 7/1984 | Graves |
| 4,492,737 | A | | 1/1985 | Conolly |
| 4,571,936 | A | * | 2/1986 | Nash et al. ..................... 60/797 |
| 4,614,453 | A | | 9/1986 | Tsuno et al. |
| 4,639,194 | A | | 1/1987 | Bell, III et al. |
| 4,719,074 | A | | 1/1988 | Tsuno et al. |
| 4,723,862 | A | | 2/1988 | Ito et al. |
| 4,784,574 | A | | 11/1988 | Tsuno et al. |
| 4,798,493 | A | | 1/1989 | Oda et al. |
| 4,815,940 | A | | 3/1989 | LeShane et al. |
| 5,104,251 | A | | 4/1992 | Fillman et al. |
| 5,262,235 | A | | 11/1993 | Heaney, III |

(Continued)

FOREIGN PATENT DOCUMENTS

EP 907049 A2 4/1999
EP 945498 B1 6/2002

(Continued)

*Primary Examiner* — Christopher Verdier
(74) *Attorney, Agent, or Firm* — Norton Rose Fulbright Canada LLP

(57) ABSTRACT

The link rod can have a core portion supported inside an annular bypass duct with a bypass air passage extending radially therebetween, the link rod comprising a hot end fitting, a cold end, and an elongated and hollow strut body of composite material and having an aerodynamic cross-sectional shape, the strut body being secured to the hot end fitting and extending between the hot end fitting and the cold end, the hot end fitting having a metal body housing a spherical bearing mountable to the core portion, and the cold end housing a spherical bearing mountable to the bypass duct wall.

19 Claims, 5 Drawing Sheets

(56) References Cited

U.S. PATENT DOCUMENTS

| | | |
|---|---|---|
| 5,281,454 A | 1/1994 | Hanson |
| 5,342,464 A | 8/1994 | McIntire et al. |
| 5,365,661 A | 11/1994 | Mizuno et al. |
| 5,390,878 A | 2/1995 | Padden |
| 5,472,537 A | 12/1995 | Friel et al. |
| 5,707,715 A | 1/1998 | deRochemont et al. |
| 5,746,391 A | 5/1998 | Rodgers et al. |
| 5,876,651 A | 3/1999 | Blackburn, Jr. et al. |
| 5,937,708 A | 8/1999 | Ito et al. |
| 5,965,240 A | 10/1999 | Blackburn et al. |
| 5,985,197 A | 11/1999 | Nelson et al. |
| 6,012,627 A | 1/2000 | Wompner et al. |
| 6,042,152 A | 3/2000 | Baldwin et al. |
| 6,143,432 A | 11/2000 | deRochemont |
| 6,168,072 B1 | 1/2001 | Schwartz et al. |
| 6,248,024 B1 | 6/2001 | Nelson et al. |
| 6,379,763 B1 | 4/2002 | Fillman |
| 6,481,172 B1 | 11/2002 | Porter |
| 6,730,382 B2 | 5/2004 | Fanucci et al. |
| 6,824,636 B2 | 11/2004 | Nelson et al. |
| 7,052,241 B2 | 5/2006 | Decker |
| 7,244,034 B1 | 7/2007 | Karandikar et al. |
| 7,410,342 B2 | 8/2008 | Matheny |
| 7,802,799 B1 | 9/2010 | Semmes |
| 7,930,866 B2 | 4/2011 | Carlson et al. |
| 8,042,766 B2 | 10/2011 | Steinke et al. |
| 8,065,848 B2 | 11/2011 | Carlson et al. |
| 8,100,634 B2 | 1/2012 | Evans |
| 8,136,758 B2 | 3/2012 | Steinke et al. |
| 8,205,825 B2 | 6/2012 | Huggins et al. |
| 2002/0190439 A1 | 12/2002 | Nelson et al. |
| 2004/0111829 A1* | 6/2004 | Bruno et al. .............. 16/2.2 |
| 2004/0121181 A1 | 6/2004 | Call |
| 2005/0002592 A1* | 1/2005 | Rogers ..................... 384/213 |
| 2007/0243070 A1 | 10/2007 | Matheny |
| 2008/0129041 A1 | 6/2008 | Allen et al. |
| 2008/0131630 A1 | 6/2008 | Schnelz |
| 2008/0295453 A1 | 12/2008 | Carlson et al. |
| 2009/0075031 A1 | 3/2009 | Carlson et al. |
| 2009/0202761 A1 | 8/2009 | Malek et al. |
| 2009/0212155 A1 | 8/2009 | Huggins et al. |
| 2009/0226700 A1 | 9/2009 | Ratke et al. |
| 2010/0001130 A1 | 1/2010 | Steinke et al. |
| 2010/0006698 A1 | 1/2010 | Steinke et al. |
| 2010/0054856 A1 | 3/2010 | Schalla et al. |
| 2010/0278586 A1 | 11/2010 | Cavaliere et al. |
| 2010/0290903 A1 | 11/2010 | Heyerman et al. |
| 2011/0033225 A1 | 2/2011 | Buchin |
| 2011/0174919 A1 | 7/2011 | Caruel et al. |
| 2011/0254267 A1 | 10/2011 | Marengo |
| 2012/0027604 A1 | 2/2012 | McDonald et al. |
| 2012/0051923 A1 | 3/2012 | McDonald et al. |
| 2012/0171025 A1 | 7/2012 | Tudor et al. |
| 2012/0171028 A1 | 7/2012 | Tudor et al. |

FOREIGN PATENT DOCUMENTS

| | | |
|---|---|---|
| EP | 907049 B1 | 11/2005 |
| EP | 2143634 A2 | 1/2010 |
| EP | 2143635 A2 | 1/2010 |
| EP | 1801354 B1 | 2/2012 |
| GB | 1430579 A | 3/1976 |
| WO | WO9808672 A1 | 3/1998 |
| WO | WO9847682 A1 | 10/1998 |
| WO | WO9934970 A1 | 7/1999 |
| WO | WO2008066606 A1 | 6/2008 |
| WO | WO2010021707 A1 | 2/2010 |
| WO | WO2011005337 A1 | 1/2011 |

* cited by examiner

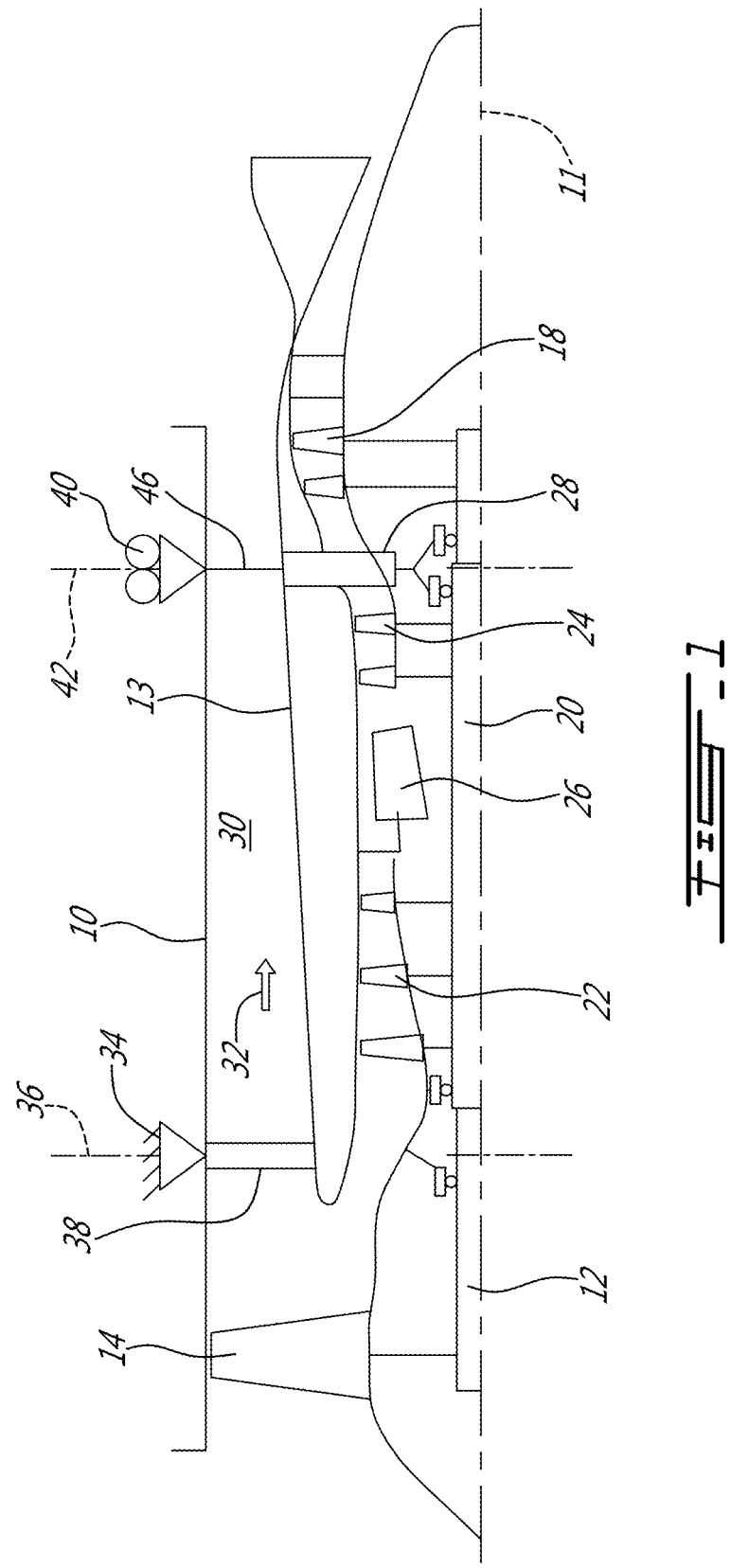

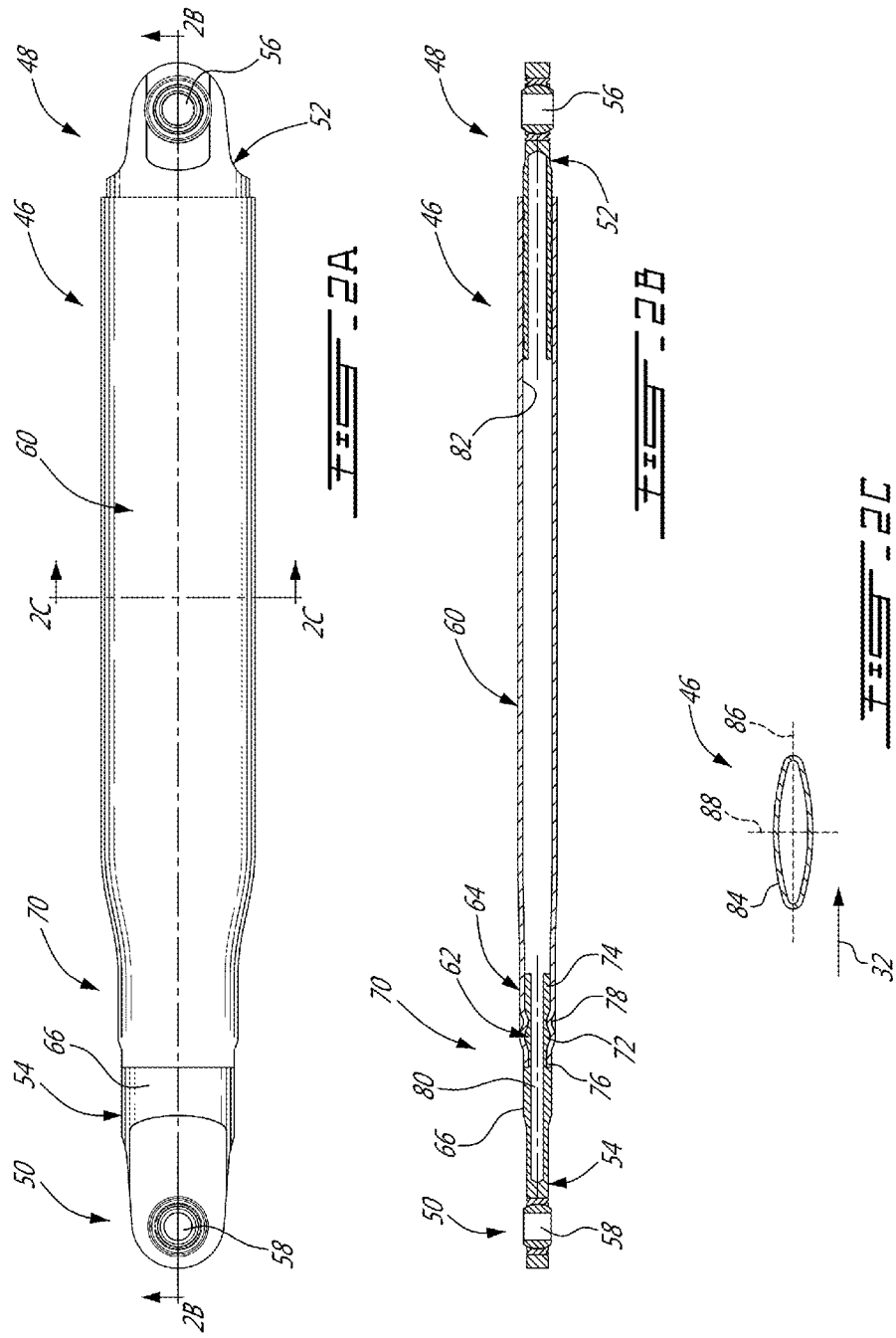

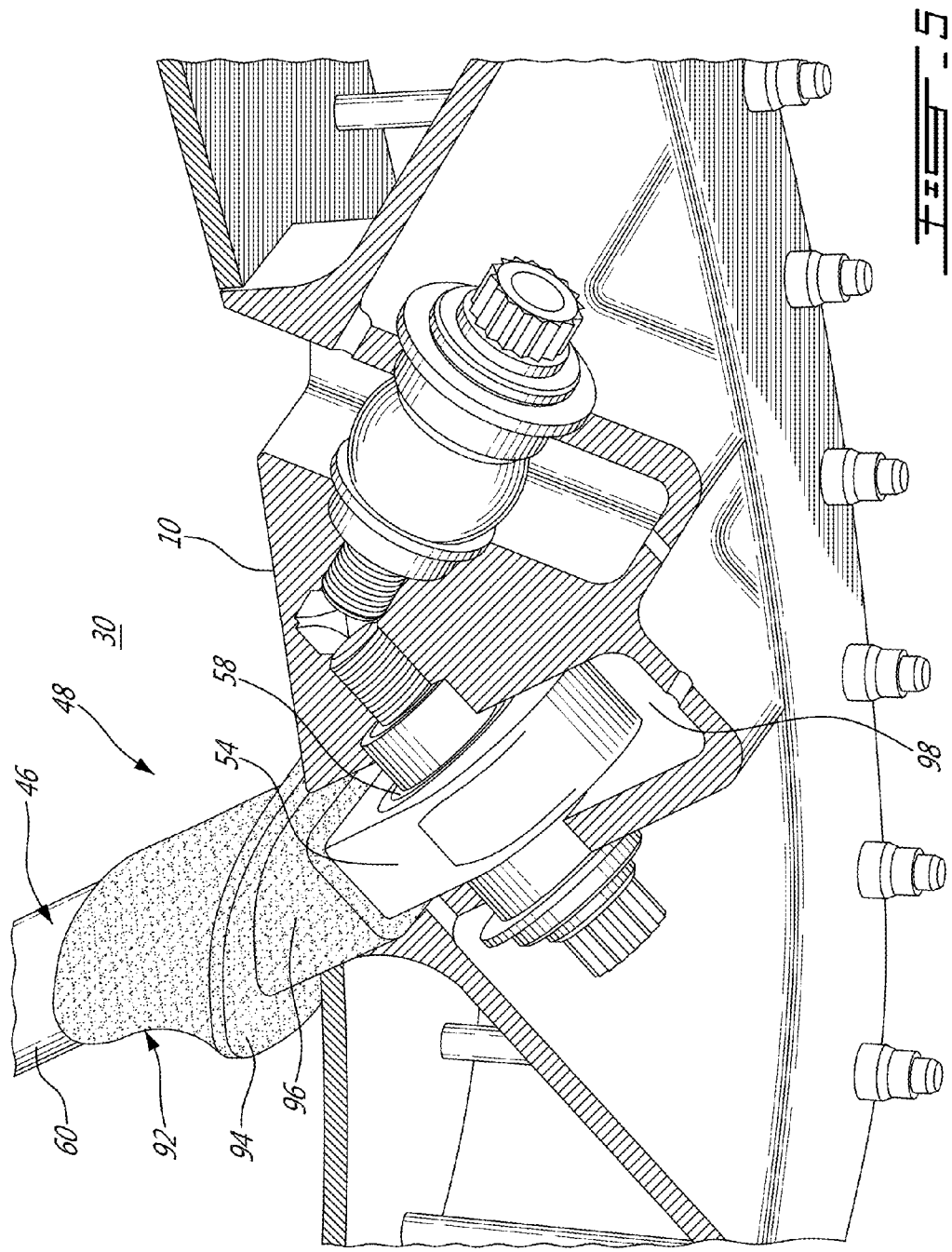

us 9,068,476 B2

HYBRID METAL/COMPOSITE LINK ROD FOR TURBOFAN GAS TURBINE ENGINE

TECHNICAL FIELD

The application relates generally to gas turbine engines, and more particularly, to link rods usable to support an engine core portion inside a bypass duct of a turbofan gas turbine engine.

BACKGROUND OF THE ART

Gas turbine engines often use links between components at different temperatures. In the case of a turbofan for instance, it is typical that the engine core portion be connected to the bypass duct at the inlet region by a plurality of stator vanes which also de-swirl the airflow from the fan. However, particularly in the case of elongated turbofan engines, such as some axial flow compressor turbofan engines for instance, it was known to use link rods to connect the engine core to the bypass duct further downstream from the stator vanes. This can help stabilize the position of the engine core relative the bypass duct which, in turn, can help reducing compressor tip clearance.

There remains room for improvement in core links for turbofan engines.

SUMMARY

In one aspect, there is provided a link rod for a turbofan gas turbine engine having a core portion supported inside an annular bypass duct with a bypass air passage extending radially therebetween, the link rod comprising a hot end fitting, a cold end, and an elongated and hollow strut body of composite material and having an aerodynamic cross-sectional shape, the strut body being secured to the hot end fitting and extending between the hot end fitting and the cold end, the hot end fitting having a metal body housing a spherical bearing mountable to the core portion, and the cold end housing a spherical bearing mountable to the bypass duct wall.

In a second aspect, there is provided mounting structure for supporting an engine core portion within an annular bypass duct wall of a turbofan gas turbine engine at an axial position of a bypass air passage defined radially between the bypass duct wall and the core portion, the mounting structure comprising a plurality of link rods extending across the bypass air passage when interconnecting the bypass duct wall and the core portion, each link rod having a hot end fitting, a cold end, and an elongated and tubular strut body of composite material secured to the hot end fitting and extending between the hot end fitting and the cold end, the hot end fitting having a metal body housing a spherical bearing connected to the core portion, and the cold end housing a spherical bearing connected to the bypass duct wall.

In a third aspect, there is provided a turbofan gas turbine engine comprising: a core portion including an inner case; an annular bypass duct wall surrounding and supporting the core portion, to thereby define a bypass air passage radially between the core portion and the bypass duct for directing a bypass air flow passing therethrough; a rod frame structure including a plurality of link rods extending across the bypass air passage and interconnecting the bypass duct wall and the core portion in a radial plane, each link rod having a hot end fitting, a cold end, and an elongated and hollow strut body of composite material secured to the hot end fitting and extending between the hot end fitting and the cold end, the hot end fitting having a metal body housing a bearing connected to the core portion, and the cold end housing a bearing connected to the bypass duct wall.

Further details of these and other aspects of the present invention will be apparent from the detailed description and figures included below.

DESCRIPTION OF THE DRAWINGS

Reference is now made to the accompanying figures, in which:

FIG. 1 is a schematic cross-sectional view of a turbofan gas turbine engine;

FIG. 2A is an elevation view of a link rod of the turbofan gas turbine engine of FIG. 1, with FIGS. 2B and 2C being cross-sectional views taken along corresponding lines thereof;

FIG. 5 is a perspective view of a portion of the link rod connected to a bypass duct of the gas turbine engine, shown fragmented and partly sectioned.

DETAILED DESCRIPTION

Figure 3A:
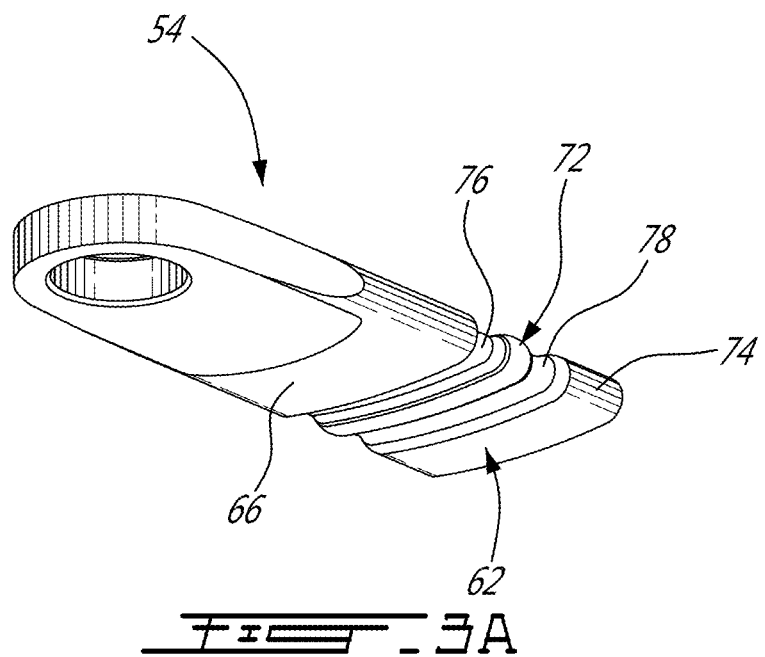
FIGS. 3A and 3B are perspective views of components of the link rod.

FIG. 1 shows an example of a long duct mixed flow (LDMF) turbofan gas turbine engine (not numbered) which includes an annular bypass duct wall 10, a low pressure spool assembly (not numbered) which includes a fan assembly 14 and a low pressure turbine assembly 18 connected by a shaft 12, and a high pressure spool assembly (not numbered) which includes a high pressure compressor assembly 22 and a high pressure turbine assembly 24 connected by a shaft 20. The shafts 12 and 20 rotate about a central axis 11 of the engine. A core portion 13 accommodates the high pressure compressor 22 and the low and high pressure turbine assemblies 18, 24, to define a main fluid path (not numbered) therethrough. In the main fluid path there is provided a combustor 26 to generate combustion gases to power the high and low pressure turbine assemblies 24, 18. An inner core case 13 houses the engine's core, and in this example includes a mid turbine frame (MTF) 28 disposed between the high and low pressure turbine assemblies 24 and 18. The core portion 13 is coaxially positioned within the annular bypass duct wall 10 and an annular bypass air passage 30 is defined radially between the annular bypass duct wall 10 and the core portion 13 of the engine for directing a bypass air flow 32 driven by the fan assembly 14, to pass therethrough.

A front mounting structure 34 is attached to the annular bypass duct wall 10 at a front axial position indicated by line 36 (representing a front mounting plane) located close to an inlet (not numbered) of the annular bypass air passage 30, to mount the engine to an aircraft (not shown). Radial struts 38 forming stator vanes are provided near the axial location of the front mounting plane 36 and extend between the bypass duct wall 10 and the core portion 13 to support the core portion 13 within the bypass duct 10, transferring thrust, lateral and vertical loads to the front mounting structure 34.

A rear mounting structure 40 is also attached to the annular bypass duct wall 10 at a rear axial position indicated by line 42 (representing a substantially vertical rear mounting plane to which the central axis 11 of the engine is perpendicular), close to an outlet (not numbered) of the bypass air passage 30. The rear mounting structure 40 can include a plurality of circumferentially spaced apart connecting brackets (not shown) connected to the bypass duct wall 10, and a plurality of link rods 46 having opposed inner and outer ends, extending across the annular bypass air passage 30.

Each link rod 46 can be connected at a cold end thereof to the bypass duct wall 10 via a connecting brackets and can be attached at a hot end thereof to the core portion 13, in this example at the mid-turbine frame 28, thereby forming a link rod structure. Generally, the link rod structure is formed between the bypass duct wall 10 and an inner case which is part of the core portion 13. The link rods 46 can support the rear portion of the engine core portion 13, short-circuiting loads therethrough, which can help stabilizing the position of the fan 14 in the bypass duct wall 10, which can, in turn, allow to design the gas turbine engine with a lower fan blade clearance between the fan 14 and the bypass duct wall 10 and thereby improve thrust and/or fuel efficiency.

During operation of the gas turbine engine, the fluids which circulate in the turbine sections 18, 24 of the engine core 13 are hot given the combustion 28, while the bypass air 32 which flows in the bypass air passage 30 can be significantly cooler. Henceforth the hot end of the link rod 46 can be exposed to high temperatures, such as 400° F. or higher for instance, while the cold end can be of a temperature closer to that of the bypass duct wall 10, which is significantly closer to atmospheric temperature. The hot fluids in the main air passage can cause a significant amount of thermal expansion in the engine core portion 13. The aft portion of the engine core 13 to which the link rods 46 are attached can thus be subjected to both radial displacement and axial displacement due to thermal growth of the engine core portion 13. Axial displacement occurs since the position of the front portion of the engine core 13 relative the bypass duct 10 is locked by the stator vane struts 38. Both types of displacement can be accommodated by the link rods 46 being oriented at least partially tangentially relative the engine core 13 and using spherical bearings to connect the link rods 46 at both ends thereof. The link rods 46 extend inside the bypass air passage 30 and therefore cause drag which can negatively affects thrust and fuel efficiency. This negative effect can be minimized by designing the arrangement of links and the cross-section thereof with a concern for aerodynamic considerations in addition to the concern for load and relative displacement considerations.

FIGS. 2A to 2C provide views of an example of a link rod 46 which can be used in a turbofan gas turbine engine such as discussed above. The link rod 46 can be seen to be generally elongated in shape and to have a cold end 48 for connection to the bypass air duct 10 and a hot end 50 for connection with the engine core portion. In this embodiment, both ends 48, 50 are provided with corresponding end fittings 52, 54 each made of a metal material and housing a corresponding spherical bearing 56, 58. The end fittings 52, 54 are interconnected by a tubular (hollow) strut body 60 which is made of a composite material and which is secured to both end fittings 52, 54 at each end thereof. The use of composite material in the design of the strut body 60 can allow to achieve significantly less weight when compared to a full metal link rod having comparable load resistance characteristics, and can be achieved at comparable costs.

Considering the light-weight aspect, it could be envisaged to use a rod made entirely of composite material. However, the high temperatures which may occur in the region of the hot end 50 can prevent using a composite having reasonable costs at the hot end 50. This challenge was overcome in this embodiment by using a hot end fitting 54 which was made from a different material than the strut body 60 and which was secured to the strut body 60. A hot end fitting 54 made of a metal material such as titanium or a titanium alloy can be selected to resist temperatures of the order of 400° F., for instance. The hot end fitting 54 can house the corresponding hot end bearing 58 at one end, and have a male portion 62 extending at the other end around which a female portion 64 of the strut body 60 can be snugly received. Depending on where exactly the bearing 58 is secured in the core portion 13, an elongated cooling portion 66 can be provided in the hot end fitting 54 between the bearing 58 and the male portion 62. The elongated cooling portion 66 can have a length designed to extend into the bypass air passage 30 for cooling, and thereby address the exposure of the composite material to the heat of the engine core portion 13.

It was envisaged to secure the female portion 64 of the strut body 60 to the male portion 62 of the hot end fitting 54 using an adhesive therebetween, however, many adhesives have limited resistance to heat. Bonding with an adhesive may be an option in cases where the elongated cooling portion 66 would be sufficiently long for cooling by convection with the bypass air 32 to overcome heating of the end adjacent the bearing 58 to core portion heat. However, increasing the length of the metallic body of the hot end fitting 54 to that extent may limit the advantages of using a hybrid metal/composite configuration, in particular when considering weight and cost considerations. Henceforth, in this particular embodiment, a positive mechanical lock 70 was used instead to secure the composite strut body 60 to the metal hot end fitting 62. The positive mechanical lock 70 is caused by the specific shape of the male portion 62 to which the female portion 64 can be made to adapt by co-curing the strut body 60 with the male portion 62 of the hot end fitting 54 positioned therein. More particularly, the male portion 62 has at least one lengthwise bulge 72, 74 which extends around the male portion 62. Given that it extends around the male portion 62, the bulge can form a closed shape around the length of the male portion 62 and can be referred to herein as an annular bulge regardless of its potentially aerodynamic non-circular shape. The male portion 62 extends toward the cold end 48, and the lengthwise bulge 72 is preceded by a narrower neck section 76, forming a catch for transferring tension loads. The bulge 72 can also be followed by an other narrower neck section 78 forming a catch for transferring compression loads. The female portion 64 snugly surrounds at least a portion of both the annular bulge and the narrower neck portion 76.

More particularly, in this particular embodiment, and as better seen in FIG. 3A, the male portion 62 has at least two bulges 72, 74 alternating with two neck portions 76, 78 to form a positive mechanical lock once the composite material of the strut body 60 is cured thereon in a mating shape. In such a configuration, the region of the strut body which covers the depression between the two bulges 72, 74 is likely to tend to form a depression as well. This depression in the strut body can be filled by a composite based on carbon or glass fibres, for instance, wrapped continuously around the strut body to bind the longitudinal laminate within the groove or depression in order to help restrain the longitudinal fibers from expanding when subjected to "hoop" loads occurring when stress acts to force the laminate up the ramp formed by the bulges 72, 74 on either side of the neck portion 78.

Figure 4A:
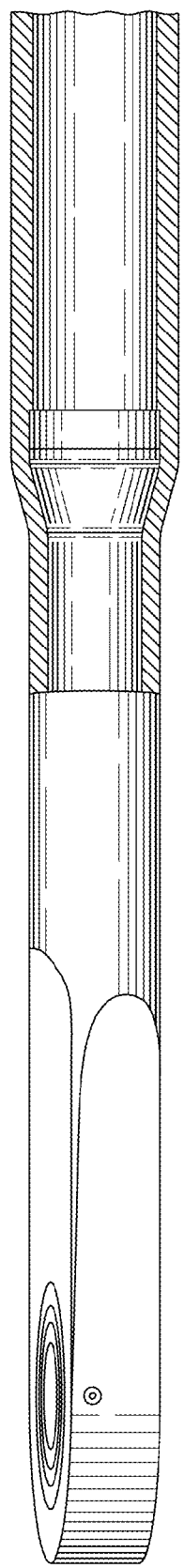
FIGS. 4A and 4B are views of alternate embodiments of a hot end of a link rod.
Figure 4B:
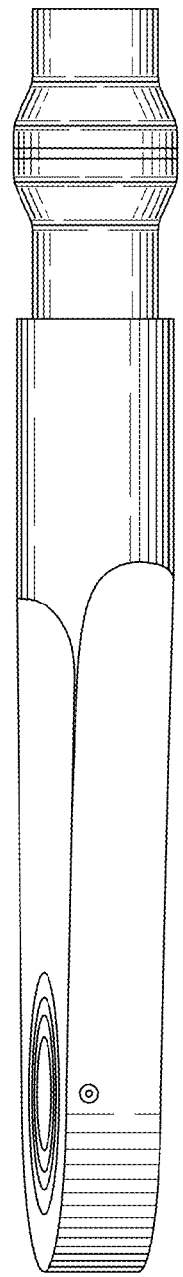

Alternate embodiments of the male portion and the mechanical lock are shown in FIGS. 4A and 4B, the embodiment of FIG. 4A having only a single neck portion and a single bulge whereas the embodiment of FIG. 4B has two neck portions and a single bulge therebetween.

Referring back to FIGS. 2A and 2B, the hot end fitting 54, is likely to expand not only lengthwisely, but also transversally due to thermal growth, as a function of its thermal expansion coefficient and the environmental temperature. Depending of the design of the hot end fitting 54 and its position in the engine, the male portion 62 may expand transversally which may affect the interface between the hot end fitting 54 and the strut body 60. The temperature of the female portion 64 of the strut body 60 is likely to be comparable to the temperature of the male portion 62 at all times. To address the impact of thermal expansion on the interface and the mechanical lock 70 it is possible to adjust the transversal coefficient of thermal expansion of the strut body 60 in a manner that it closely matches the coefficient of thermal expansion of the male portion 54. For a given type of composite material, e.g. a carbon/epoxy matrix, the transversal coefficient of thermal expansion of the strut body 60 can be adjusted independently to its longitudinal coefficient of thermal expansion via selection of a relative percentage of transversally-oriented fibers (e.g. carbon fibers) compared to the longitudinally-oriented fibers. An appropriate percentage can vary depending on the design considerations of specific applications and depending on the type of composite material. It will be understood that the architecture of a braided preform can vary along the length and transversal fibers can be provided only in the viscinity of the hot end fitting if desired.

While satisfying all other needs, it is desired to maintain the weight of the hot end fitting 54 to a minimum. This can be addressed by minimizing its size and optionally by creating weight reduction apertures therein. In this example, at least one weight reduction bore 80 is machined inside the hot end fitting 54 from the end of the male portion 62.

Concerning the cold end 48 of the link rod, since it is not subjected to hot temperatures such as the hot end 50 can be, its design poses less constraints. In the illustrated embodiment, it is embodied with a cold end fitting 52 which can simply be snugly received by a corresponding female portion 82 of the strut body 60 and bonded thereto using an adhesive. The cold end fitting 52 can be made of a metal such as titanium, or alternately such as aluminium, for instance, given that less temperature resistance is required at the cold end 48. Alternately, the cold end 48 can have some form of fitting or extension of the strut body 60 made of composite material or another material (not shown) which directly receives the bearing 56. Such a composite fitting can be co-cured with the tubular strut body 60 for instance.

One feature which can be sought in a link rod 46 is the possibility of directly interchanging link rods, such as for replacement after the useful life limit has been reached. The interchangeability is greatly improved if the link rod 46 can be manufactured with a bearing axis-to-bearing axis length within very low tolerances. This can be a challenge in the case of a hybrid link rod since the length of the composite strut body 60 can vary in a manner difficult to precisely predict during curing.

Figure 3B:
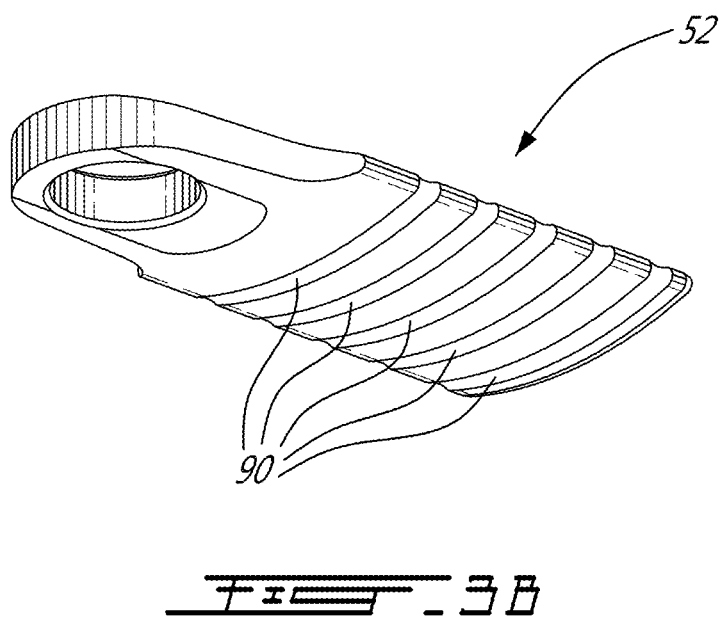

One way to address this challenge is by providing at least one fitting which is assembled to the strut body 60 after it has cured. To this end, in the illustrated embodiment, since the strut body 60 is cured directly on the hot end fitting 54, the cold end 48 of the strut body 60 is left with a female opening 82 and straight hollow section which corresponds in shape to a straight male member of the cold end fitting 52 for the male member to be snugly receivable in the female opening by sliding it therein and adhering it therein by an adhesive, i.e. the inner wall of the female member extends straight and parallel to the length of the strut body and forms an engagement path for the male member. In this manner, the cold end fitting 52 can be assembled to the hot end fitting 54 and strut body 60 sub-assembly in a simple jig in which the position of both bearings 56, 58 is precisely determined. The strength of the adhesive bond can be improved by designing the male member of the cold end fitting 52 with optional lengthwisely interspaced annular grooves 90 such as shown in FIG. 3B.

It will be noted here that although the size of the cold end vs. the hot end can depart from that illustrated and can be adjusted independently. In some embodiments, economies in costs may be realized by making the profile the same at both ends. In other embodiments, the hot end can be made smaller to create a larger corner radius for the carbon fibre in the co-cured end for improved drape-ability of the fabric, while simultaneously reducing the amount of titanium, for instance.

The strut body 60 is the portion of the link rod 46 which is most exposed to the flow of bypass air. Henceforth, while satisfying tension load resistance specifications and compression (buckling) resistance specifications, which are typically addressed in the design of the composite material matrix, it is desired to maintain the strut body 60 very aerodynamic.

In this particular embodiment, as shown in FIG. 2C, this need is addressed by designing the strut body 60 with a cross-sectional contour shape 84 which is ellipsoid-like, with a long (major) axis perpendicular to a short (minor) axis, similar to a vane. In the bypass air passage 30, the link rod 46 can be oriented in a manner that the long axis 86 is oriented parallel to the flow of bypass air 32, so as to create a minimal disruption in the flow. There can be trade-off between buckling resistance and aero losses to consider. Elongating the ellipsoid-like shape can improve aero efficiency, but can add weight with minimal improvements to buckling capacity. In certain embodiments, to further optimize the link, it can be preferred to specifically design a different leading edge configuration vs. trailing edge configuration. However, using a symmetrical design can reduce the likelihood of the link rod being installed in the wrong direction.

Further, turning to FIG. 5, it can be understood that the region at which the link rod is attached to the bypass duct wall 10, which can be referred to as the outer duct wall interface, and the one where it is attached to the engine core portion, can be particularly susceptible to aerodynamic losses. In this embodiment, this can be addressed at least with respect to the bypass duct wall interface by using a link rod boot 92 snugly surrounding a portion of the cold end 48 adjacent the bearing 58. The link rod boot 92 has a gap covering extension 94 which protrudes transversally around the link rod 46 and having an annular flat surface abuttable against the bypass duct wall 10 to cover a gap between the link rod 46 and the bypass duct wall 10. The link rod boot 92 can significantly reduce aerodynamic end wall losses formed by turbulence at the intersection of an tangentially-angled strut with the bypass duct surface.

In addition to aiding in reducing aerodynamic losses, the boot 92 can have an extension, or male member 96, fitted snugly into an aperture 98 in the bypass duct wall 10 and cooperating therewith to prevent swivelling about the two end spherical bearings 58, thus favouring optimum aerodynamic alignment (orientation) of the link rod 46.

The above description is meant to be exemplary only, and one skilled in the art will recognize that changes may be made to the embodiments described without departing from the scope of the invention disclosed. For example, the link rods can be used in other types of gas turbine engines than those referred to above, such as centrifugal compressor turbofans for instance. Still other modifications which fall within the scope of the present invention will be apparent to those skilled in the art, in light of a review of this disclosure, and such modifications are intended to fall within the scope of the appended claims.

What is claimed is:

1. A turbofan gas turbine engine comprising:
a front mounting structure attached to an annular bypass duct wall at a front axial position of a bypass air passage defined radially between the bypass duct wall and a core portion of the engine, the front mounting structure supporting the core portion within the bypass duct wall; and
a rear mounting structure attached to the bypass duct wall at a rear axial position of the bypass air passage, the rear mounting structure including a plurality of link rods extending across the bypass air passage and interconnecting the bypass duct wall and the core portion, each link rod having a hot end fitting, a cold end, and an elongated and tubular strut body of composite material secured to the hot end fitting and extending between the hot end fitting and the cold end, the hot end fitting having a metal body housing a spherical bearing connected to the core portion, and the cold end housing a spherical bearing connected to the bypass duct wall, wherein the composite material has a higher percentage of fibers oriented parallel to the length of the strut, and a lower percentage of fibers oriented transversally to the length of the strut, the lower percentage of transversal fibers being adapted to provide a transversal coefficient of thermal expansion comparable to a coefficient of thermal expansion of the metal.

2. The turbofan gas turbine engine of claim 1 wherein the hot end fitting has a male portion extending toward the cold end, and the strut body has a female end portion snugly receiving the male portion.

3. The turbofan gas turbine engine of claim 2 wherein the male portion has at least one annular bulge spaced from the hot end fitting spherical bearing by a narrower neck section, and the female end portion snugly surrounds at least a portion of both the annular bulge and the narrower neck section.

4. The turbofan gas turbine engine of claim 3 wherein the male portion has at least a second narrower neck section snugly surrounded by the female end portion and spaced from the spherical bearing of the hot end fitting by the annular bulge, wherein the annular bulge allows the transmission of both compressive and tension loads between the strut body and the hot end fitting.

5. The turbofan gas turbine engine of claim 2 wherein the hot end fitting has an elongated cooling portion extending between the spherical bearing of the hot end fitting and the male portion, the elongated cooling portion extending into the bypass air passage.

6. The turbofan gas turbine engine of claim 2 wherein the hot end fitting has at least one bore extending therein from an opening located on an end of the male portion located inside the strut body.

7. The turbofan gas turbine engine of claim 1 wherein the metal body of the hot end fitting is made of titanium or a titanium-based alloy.

8. The turbofan gas turbine engine of claim 1 wherein the composite material has carbon/epoxy composite material.

9. The turbofan gas turbine engine of claim 1 wherein the strut body has an ellipsoid-like aerodynamic elongated cross-sectional contour shape with a long axis perpendicular to a short axis in a cross-sectional plane, the long axis being oriented parallel to a direction of air flow in the air passage.

10. The turbofan gas turbine engine of claim 1 wherein the cold end has a male portion extending toward the hot end fitting, and the strut body has a female cold end portion snugly receiving the male portion of the cold end.

11. The turbofan gas turbine engine of claim 10 wherein the female cold end portion has an inner wall extending straight, parallel to a length of the strut body, and forming an engagement path for the male portion of the cold end, and the cold end male portion has a straight neck portion mating with the inner wall for sliding engagement therewith, the straight neck portion being adhered to the inner wall.

12. The turbofan gas turbine engine of claim 11 wherein the cold end includes a cold end fitting having a metal body.

13. The turbofan gas turbine engine of claim 1 wherein the cold end is a composite material extension to the strut body.

14. A mounting structure for supporting an engine core portion within an annular bypass duct wall of a turbofan gas turbine engine at an axial position of a bypass air passage defined radially between the bypass duct wall and the core portion, the mounting structure comprising a plurality of link rods extending across the bypass air passage when interconnecting the bypass duct wall and the core portion, each link rod having a hot end fitting, a cold end, and an elongated and tubular strut body of composite material secured to the hot end fitting and extending between the hot end fitting and the cold end, the hot end fitting having a metal body housing a spherical bearing connected to the core portion, and the cold end housing a spherical bearing connected to the bypass duct wall, wherein the composite material has a higher percentage of fibers oriented parallel to the length of the strut, and a lower percentage of fibers oriented transversally to the length of the strut, the lower percentage of transversal fibers being adapted to provide a transversal coefficient of the thermal expansion comparable to a coefficient of thermal expansion of the metal.

15. A link rod for a turbofan gas turbine engine having a core portion supported inside an annular bypass duct with a bypass air passage extending radially therebetween, the link rod comprising a hot end fitting, a cold end, and an elongated and hollow strut body of composite material and having an aerodynamic cross-sectional shape, the strut body being secured to the hot end fitting and extending between the hot end fitting and the cold end, the hot end fitting having a metal body housing a spherical bearing mountable to the core portion, and the cold end housing a spherical bearing mountable to the bypass duct wall, wherein the composite material has a higher percentage of fibers oriented parallel to the length of the strut, and a lower percentage of fibers oriented transversally to the length of the strut, the lower percentage of transversal fibers being adapted to provide a transversal coefficient of thermal expansion comparable to a coefficient of thermal expansion of the metal.

16. The link rod of claim 15 having a boot snugly surrounding a portion of the cold end, and having a gap-covering extension protruding transversally around the link rod and having an annular flat surface abuttable against the bypass duct wall.

17. The link rod of claim 15 having a boot snugly surrounding a portion of the cold end, the boot having a male member snugly receivable in an aperture of the annular bypass duct wall to cooperate therewith in maintaining the orientation of the strut body relative to airflow in the bypass air passage.

18. The turbofan gas turbine engine of claim 15 wherein the hot end fitting has a male portion extending toward the cold end, and the strut body has a female end portion snugly receiving the male portion, the male portion having at least one annular bulge spaced from the hot end fitting spherical bearing by a narrower neck section, and the female end portion snugly surrounds at least a portion of both the annular bulge and the narrower neck section.

19. The turbofan gas turbine engine of claim 18 the male portion has at least a second narrower neck section snugly surrounded by the female end portion and spaced from the hot end fitting spherical bearing by the annular bulge, wherein the annular bulge allows the transmission of both compressive and tension loads between the strut body and the hot end fitting.

\* \* \* \* \*